United States Patent
Kinder et al.

(10) Patent No.: US 7,152,935 B2
(45) Date of Patent: Dec. 26, 2006

(54) OPERATION OF A VEHICLE BRAKE SYSTEM IN DEPENDENCE UPON BRAKE SURFACE TEMPERATURES

(75) Inventors: Ralf Kinder, Eitelborn (DE); Ralf Leiter, Vallendar (DE); Gregor Poertzgen, Koblenz (DE)

(73) Assignee: Lucas Automotive GmbH (DE)

( * ) Notice: Subject to any disclaimer, the term of this patent is extended or adjusted under 35 U.S.C. 154(b) by 0 days.

(21) Appl. No.: 10/850,317

(22) Filed: May 20, 2004

(65) Prior Publication Data

US 2004/0212251 A1 Oct. 28, 2004

Related U.S. Application Data

(63) Continuation of application No. PCT/EP02/12917, filed on Nov. 18, 2002.

(30) Foreign Application Priority Data

Nov. 23, 2001 (DE) ............... 101 57 449
Jun. 24, 2002 (DE) ............... 102 28 115

(51) Int. Cl.
*B60T 8/32* (2006.01)
*G06F 7/70* (2006.01)

(52) U.S. Cl. .......... 303/191; 303/167; 701/70

(58) Field of Classification Search ......... 303/191, 303/113.2, 136, 166, 167, 176; 188/1.11 R, 188/1.11 E, 1.11 W; 701/70, 71, 75, 82
See application file for complete search history.

(56) References Cited

U.S. PATENT DOCUMENTS

| | | | | |
|---|---|---|---|---|
| 4,790,606 A | * | 12/1988 | Reinecke | 303/191 |
| 5,524,974 A | | 6/1996 | Fischle et al. | 303/191 |
| 5,685,619 A | * | 11/1997 | Brown | 303/145 |
| 5,731,975 A | * | 3/1998 | Nakashima | 701/83 |
| 6,019,436 A | | 2/2000 | Siepker | |
| 6,256,570 B1 | | 7/2001 | Weiberle et al. | |
| 6,394,235 B1 | | 5/2002 | Poertzgen et al. | |
| 6,456,922 B1 | * | 9/2002 | Gamberg | 701/71 |
| 6,536,562 B1 | | 3/2003 | Böhm et al. | |
| 6,655,502 B1 | | 12/2003 | Sokoll et al. | |
| 6,804,598 B1 | * | 10/2004 | Eckert et al. | 701/71 |
| 2002/0046909 A1 | | 4/2002 | Sokoll et al. | |
| 2004/0041464 A1 | * | 3/2004 | Eckert et al. | 303/7 |
| 2004/0046444 A1 | | 3/2004 | Heubner et al. | |

FOREIGN PATENT DOCUMENTS

| | | |
|---|---|---|
| DE | 34 07 716 | 9/1985 |
| DE | 38 13 514 | 11/1989 |
| DE | 40 20 693 | 2/1992 |
| DE | 43 16 993 | 11/1994 |
| DE | 4316993 A1 * | 11/1994 |
| DE | 44 18 768 | 12/1995 |
| DE | 196 32 863 | 2/1998 |
| DE | 197 30 094 | 1/1999 |
| DE | 198 35 550 | 2/2000 |
| DE | 198 61 144 | 5/2000 |

(Continued)

*Primary Examiner*—Pam Rodriguez
(74) *Attorney, Agent, or Firm*—MacMillan, Sobanski & Todd, LLC (57) ABSTRACT

The invention provides a solution, which makes it possible to determine brake surface temperatures for a vehicle brake system in dependence upon decelerations or accelerations acting on a vehicle in an activated state of the vehicle brake system and to control the vehicle braking system in dependence upon the brake surface temperatures.

25 Claims, 1 Drawing Sheet

FOREIGN PATENT DOCUMENTS

| | | |
|---|---|---|
| DE | 199 43 352 | 4/2001 |
| DE | 100 12 448 | 10/2001 |
| DE | 100 29 238 | 12/2001 |
| EP | 1 083 360 | 3/2001 |
| FR | 2 794 825 | 12/2000 |
| WO | 99/05011 | 2/1999 |
| WO | 02/22417 | 3/2002 |

* cited by examiner

Fig. 1

OPERATION OF A VEHICLE BRAKE SYSTEM IN DEPENDENCE UPON BRAKE SURFACE TEMPERATURES

CROSS REFERENCE TO RELATED APPLICATIONS

This application is a continuation of International Application No. PCT/EP02/12917 filed Nov. 18, 2002, the disclosures of which are incorporated herein by reference, and which claimed priority to German Patent Application No. 101 57 449.5 filed Nov. 23, 2001 and German Patent Application No. 102 28 115.7 filed Jun. 24, 2002, the disclosures of which are incorporated herein by reference.

The present invention relates generally to the determination of the temperature of a brake surface of a vehicle brake system, which brake surface may comprise a brake disk and/or a brake lining. In particular, the present invention relates to the determination of the temperatures of brake surfaces of a vehicle brake system in dependence upon a deceleration or acceleration of a vehicle during a braking operation and to the operation of the vehicle brake system in dependence upon the brake surface temperatures.

BACKGROUND OF THE INVENTION

From DE 100 12 448 A1 a method of distributing the braking force in vehicles is known, which checks whether wheel brakes are overheated or at risk of overheating. If so, the wheel brakes are alternately loaded with braking force. The effect achieved by this is that in the periods, during which one of the wheel brakes is not loaded with braking force, this wheel brake may cool down. In order to allow emergency braking operations also for wheel brakes that are overheated or at risk of overheating, the wheel brakes are loaded, not in the described manner, but in a conventional manner with braking force when vehicle decelerations are specified, which exceed a limit value. Here, overheating or a risk of overheating of wheel brakes exists if the temperature of the wheel brakes has exceeded a predetermined limit range or limit value or lies within a predetermined temperature range, the exceeding of which counts as overheating. For this purpose, it is provided that the temperatures of the wheel brakes are directly detected by temperature sensors or determined with the aid of a temperature model. Given the use of a temperature model, it is provided that, as a basis, quantities are used, which indicate hydraulic pressures in the case of hydraulic brakes, current input in the case of electromechanical brakes, brake application time and the like.

According to DE 44 18 768 A1, and corresponding U.S. Pat. No. 5,524,974 A1, both of which are incorporated by reference herein, the temperature of a brake surface of a motor vehicle wheel is calculated indirectly from the wheel rotational speed and brake condition data. During vehicle operation, the brake surface temperature is cyclically re-determined, wherein in each cycle the current brake surface temperature is reduced by a first value to, at least, a preset minimum temperature. It is further provided that upon an activation of the wheel brake the current brake surface temperature in each cycle is increased in each case by a second value, which is determined in dependence upon data resulting from detected wheel rotational speeds and/or from quantities derivable therefrom. The quantities derivable from the data for detected wheel rotational speeds comprise the vehicle velocity and a vehicle deceleration because of the braking effect. For determining the second value, which is used to increase the current brake surface temperature, the deceleration energy, which is converted into thermal energy and supplied as such to the wheel brake, is calculated, which is proportional to the product of vehicle velocity and vehicle deceleration. To prevent damage of the brake surfaces, regulating interventions of the control system of the brake system (e.g. ABS, electronic traction system) are in dependence upon the brake surface temperatures automatically interrupted, switched off or stopped for the time being in order to avoid excessive heating of the brake surfaces. This may lead e.g. in a situation, which the vehicle driver is no longer able to control on his own and which would require assistance in the form of a regulated operation of the brake system, to this assistance not being made available owing to excessive brake surface temperatures. This in turn may result in damage to the vehicle that is more serious than potential damage of brake surfaces caused by overheating.

For determining a temperature of a brake disk of a motor vehicle, from DE 38 13 514 A1 it is known to use a transmitter, which responds to changes of temperature and is disposed in the vicinity of the brake disk in order to detect its thermal radiation. For this it is necessary to dispose a suitable, temperature-sensitive transmitter at each brake disk that is to be monitored. The fact that the transmitters are disposed at a distance from the brake disks may lead to incorrect temperature determination, e.g. because of road spray or fouling of the sensor or detection by the transmitter of thermal radiation given off by other components of the vehicle.

DE 199 43 352 A1 discloses an apparatus and a method of determining the temperature of braking elements provided on a vehicle, whereby the instantaneous kinetic energy of the vehicle is calculated and compared to a previous value of the kinetic energy of the vehicle. Upon a decrease of the kinetic energy of the vehicle, from this decrease the thermal energy supplied to the brake elements is calculated and from this the temperatures of the brake elements are calculated. To determine the kinetic energy of the vehicle, the mass of the vehicle including the payloads and the instantaneous vehicle velocity are used. In order, when calculating the temperatures of the brake elements, to take account of external influences, such as e.g. the gradient of the road, the condition of the road surface and/or the resultant friction of the vehicle wheels on the road surface, the laden state of the vehicle, the variation of the drag coefficient of the vehicle caused e.g. by a roof load, and the like, in each case corresponding quantities are determined, e.g. by means of additional sensors, and used when calculating the temperatures of the brake elements.

From DE 43 16 993 A1 it is known to determine the temperature of brake disks of a vehicle brake system indirectly, i.e. without the aid of corresponding sensors. For this purpose, during a braking operation quantities characterizing the energy balance of the motor vehicle are acquired, such as e.g. the vehicle weight, the vehicle velocity and vehicle acceleration, wheel peripheral speeds and wheel accelerations and the road gradient. From these quantities, the frictional work to be done by each brake lining and the friction power are calculated. The temperature of the brake disks is then determined in each case from the corresponding calculated frictional work and friction power, the active brake disk mass and the specific thermal capacity of the brake disk material. The determined brake disk temperature is used to obtain information about the load state of the brake system and about whether a specific braking sequence, i.e. a chronological order of braking forces at the brake disks is capable of keeping the brake disk temperature within a desired range. Indications of the further use of such information are not to be found in this document.

From DE 40 20 693 A1 it is known to calculate temperature changes of brakes for short preset intervals from the sum of the square of the vehicle velocity and the square of the vehicle deceleration, multiplied in each case by a vehicle-specific constant. Should a temperature rise lead to the exceeding of a limit value for the brake temperatures, a warning lamp switches on. Furthermore, the engine torque may be reduced in order to achieve a speed, at which stopping without brakes or braking without brake overheating is possible. This automatic speed reduction may lead to dangerous driving situations, e.g. when travelling on motorways. Alternatively, it is provided that in the event of excessive brake temperatures the antiskid device of the vehicle is switched off. This has the drawback that, whilst damage to the brakes caused by excessive temperatures may be avoided, this is offset by the fact that more serious damage of the vehicle may occur as a result of the antiskid device being switched off.

SUMMARY OF THE INVENTION

The present invention improves the operation of the vehicle brake system in such a way that desired driving or operating states are maintained or achieved in dependence upon brake surface temperatures. What is more, thermal damage of the brake surfaces is to be avoided, while in undesirable, in particular critical, driving situations the necessary braking forces are still to be made available. The present invention provides a method for a vehicle brake system, whereby the temperature of one or more brake surfaces is determined in dependence upon a deceleration caused by a braking operation. In the present case, allowance is made for braking operations that are triggered e.g. by means of an actuation of the vehicle brake system by a vehicle driver, by means of a control unit (e.g., ECU=electronic control unit) of the vehicle for controlling the operation of the vehicle (e.g. electronic stability control, electronic traction control, antiskid control etc.) and by a control system for the vehicle brake system (e.g., brake assistant, controlled parking brake, parking brake, traction-assist feature, park distance control system, brake assistant etc.).

It is further intended to determine brake surface temperatures in dependence upon an acceleration when the vehicle brake system is generating braking forces. This may be the case, for example, when during acceleration of the vehicle the vehicle driver keeps up an actuation of the vehicle brake system, the vehicle brake system maintains braking forces or has not yet built up braking forces, when the vehicle brake system is operated e.g. as a hand brake, parking brake or traction-assist feature, the vehicle control system e.g. in dependence upon the acceleration operation activates the vehicle brake system in order, for example, to control slip or traction, and the like. Furthermore, in this manner brake surface temperatures are determined in the event of an acceleration of the vehicle when, e.g. owing to a malfunction of the vehicle brake system itself or of other components of the vehicle, the vehicle brake system is activated in an undesired manner.

In dependence upon the determined brake surface temperatures, braking forces acting on the brake surfaces and, in particular, the level of said braking forces are then controlled.

According to the invention the braking forces acting on the brake surfaces are controlled in such a way that a desired driving state, which requires an activation of the vehicle brake system and/or in which the vehicle brake system is activated, is maintained or achieved without this leading to excessive brake surface temperatures.

The braking force control may also be effected in that undesired driving or operating states of the vehicle (e.g. skidding, overturning, rolling away) may be avoided, preferably without excessive brake surface temperatures.

If a desired driving state may be achieved and/or if an undesired driving or operating state may be avoided only if the vehicle brake system is or remains activated, even though excessively high brake surface temperatures exist and/or excessively high brake surface temperatures may arise, it is intended to generate and/or permit corresponding braking forces under the control of the vehicle brake system and/or because of an actuation of the vehicle brake system by a vehicle driver. In this way, it is possible to avoid vehicle damage that is more serious than the damage caused to brake surfaces by excessively high temperatures.

If, for example, it is established that the temperature of one or more brake surfaces lies above a predetermined, admissible value, the vehicle brake system may be controlled in such a way that, after excessively high brake surface temperatures have been detected, affected brake surfaces are loaded with reduced forces. In said case, in order to achieve a desired braking effect, brake surfaces at tolerable temperatures may be exposed to higher forces. Furthermore, in dependence upon the brake surface temperatures individual functions or a plurality of functions of a control system of the vehicle (e.g. ABS, electronic stability program, traction control, antiskid control) may be partially or totally deactivated and/or enabled only for specific driving states, in particular extreme driving states.

In a vehicle with ABS, ABS is normally activated during each braking operation, even though this is not necessary for each braking operation and may lead to undesirable or inadmissible rises in the temperature of the brake surfaces. This may be prevented by the present invention. When critical brake surface temperatures are detected, i.e. temperatures, which are too high or at which there is a risk that, e.g. because of the vehicle operation characteristic, excessively high brake surface temperatures will be reached, the assistance provided by ABS may be reduced or stopped entirely. In the present case, it is provided that, in addition to the brake surface temperature, the respective driving and/or operating state of the vehicle is taken into account.

If, given critical brake surface temperatures, driving or operating states arise that are manageable, e.g. by reducing the engine power or by steering manoeuvres of the vehicle driver, without activating the vehicle brake system, no braking forces should be generated at the brake surfaces. For driving or operating states that are achievable or maintainable only with the assistance of the vehicle brake system it is advantageous, even given critical brake surface temperatures, to activate the vehicle brake system. In the case of driving and operating states, in which assistance from the vehicle brake system is not absolutely necessary but would be helpful, and/or in the case of brake surface temperatures, which are not, or not yet classifiable as critical, it is provided that the braking forces at the brake surfaces are generated in a graduated manner. In other words, the level of the braking forces is controlled in such a way that no undesirable driving or operating situations arise and the brake surface temperatures in said case lie within a permissible range.

When the vehicle brake system comprises a hand brake or parking brake, knowledge of the brake surface temperatures is extremely important because in the stationary state of the vehicle the brake surfaces cool down and, owing to the resulting "reduction in size" of the brake surfaces (also known as so-called "lining shrinkage"), the brake application force diminishes. In order to guarantee that after cooling of the brake surfaces the vehicle brake system provides sufficient braking forces to prevent the vehicle from rolling away, the current brake surface temperature and/or the characteristic thereof may be determined in dependence upon the brake surface temperatures determined upon attainment of the stationary state of the vehicle, in combination with information characterizing the cooling of the brake surfaces and/or one of the above-mentioned temperature determination for a non-accelerated or non-decelerated vehicle. In dependence upon the respective current brake surface temperatures thus determined, the vehicle brake system may then be controlled in such a way that the forces acting on the brake surfaces are increased in order to compensate their cooling-down effect.

In a preferred embodiment of the present invention, a deceleration or acceleration of the vehicle itself is taken as a basis for the brake surface temperature determination.

In a further preferred embodiment, which is provided optionally or alternatively to the previously described embodiment, for the temperature determination the decelerations or accelerations arising at the individual wheels are used in order to determine the temperature of the corresponding brake surface.

Preferably, brake surface temperatures are moreover determined in dependence upon the length of time, for which the vehicle brake system is activated in the event of a deceleration or acceleration. In this manner, when determining the temperature of the brake surfaces, dynamic characteristics of the activated operating state of the vehicle operating system are taken into account. This leads to more accurate temperature determination if, for example, the vehicle is rapidly decelerated for a short period or gently accelerated over an extended period.

In a further preferred embodiment of the present invention, for the determination of brake surface temperatures the vehicle deceleration or vehicle acceleration is used to determine the current kinetic energy of the vehicle. The current kinetic energy of the vehicle is then used to determine the temperature of the brake surfaces. For this purpose, for example, the current kinetic energy of the vehicle may be compared to a kinetic energy of the vehicle before and/or during an activation of the vehicle brake system and/or to a previously determined current kinetic energy of the vehicle. The change of the kinetic energy of the vehicle thus determined indicates how much thermal energy (at most) has been supplied to the brake surfaces.

For calculating the kinetic energy of the vehicle that may be used for a comparison with the current kinetic energy of the vehicle, it is provided that the velocity of the vehicle upon initiation of an activation of the vehicle brake system is taken as a basis.

Preferably, for calculation of the instantaneous kinetic energy of the vehicle, the kinetic energy is determined in dependence upon the vehicle deceleration or vehicle acceleration and the length of time, for which the vehicle brake system is activated.

Given a temperature determination on the basis of decelerations and accelerations arising at individual wheels of the vehicle, the current kinetic energy may be determined for each of the wheels, at which braking forces are generated. For this purpose, it is possible to use e.g. the respective angular acceleration of the wheels.

In order to determine the thermal energy, which is supplied to the brake surfaces acted upon by braking forces, and from this thermal energy determine the temperature of the brake surfaces, a change of the kinetic wheel energy is determined on the basis of the respective current kinetic energy of the corresponding wheel. For this purpose, the current kinetic wheel energy may be compared to a previously determined current kinetic energy of the respective wheel. Alternatively, it is possible to use for this comparison the kinetic energy of a wheel that results from the corresponding angular velocity, which the wheel has before or during the generation of braking forces at said wheel.

Furthermore, given a temperature determination of brake surfaces on the basis of decelerations and accelerations arising at the individual wheels, the respective effective braking forces may be determined in order to determine from these, in combination with the determined wheel decelerations and/or wheel accelerations, the work done at the respective brake surface and, from this, the thermal energy supplied to said brake surface.

Furthermore, when determining the kinetic energy values for the various determination instants further quantities may be taken into account, such as e.g. the mass of the vehicle including any roof loads, vehicle-specific quantities and in particular quantities specific to the vehicle brake system, and the like.

As stated above, the current kinetic energy and/or a change of the kinetic energy of the vehicle indicates which energy may be supplied (at most) to the brake surfaces. On this basis, the thermal energy supplied to the brake surfaces may be estimated, determined or exactly calculated. In the present case, it is intended to take as a basis for the temperature determination not only the thermal energy, which is supplied to the brake surfaces upon an activation of the vehicle brake system and because of the braking forces resulting therefrom, but also thermal energy, which may lead, independently of an activation of the vehicle brake system, to a brake surface temperature rise. This includes e.g. thermal radiation of the vehicle engine or other vehicle components, e.g. electric motors for the vehicle brake system, exhaust gas heat and the ambient temperature, in particular the ambient temperature effective in the vicinity of the brake surfaces.

Furthermore, when determining the brake surface temperature, thermal energy released by the brake surfaces before, during and/or after an activation of the vehicle brake system may be taken into account. Such a dissipation of thermal energy may occur, for example, because of cooling of the brake surfaces and the area surrounding them, as a result of cooling caused by the slip stream, by means of active cooling, e.g. in the form of a blower, and the like.

Preferably, one or more or all of the quantities, which are used for brake surface temperature determination, are determined using vehicle components that are already provided. For example, it is possible to use for this purpose a vehicle control system, which provides functions of an anti-lock braking system, an electronic stability program, traction control and/or antiskid control. To determine the actual moving mass of the vehicle, sensors for the vehicle suspension system and/or of a level control may be used. If the vehicle brake system likewise comprises a control system, then data provided by said control system may also be used.

For determining the actually existing current brake surface temperature, it is intended to take as a basis a brake surface temperature, which the brake surfaces have in the stationary state of the vehicle, in particular after the vehicle has been in a stationary state for an extended period. In an advantageous manner, here too, the ambient temperature is taken into account.

In order further to determine temperature changes of the brake surfaces that arise when the vehicle is travelling at a constant velocity, the brake surface temperature determination may be effected in dependence upon the vehicle velocity. In said case, preferably one or more quantities are determined, which indicate the degree of activation of the vehicle brake system. On the basis of said quantity or quantities for an activation of the vehicle brake system that leads to no vehicle deceleration or vehicle acceleration, and on the basis of the vehicle velocity the brake surface temperature may then be determined e.g. by determining the kinetic energy of the vehicle.

Alternatively or additionally, it is provided that for operating states of the vehicle, in which no decelerations or accelerations occur, forces acting upon the brake surfaces are determined for temperature determination.

In a further preferred embodiment, on the basis of the temperature and/or temperature change of one or more brake surfaces a wear thereof is determined. For this purpose, it is possible to use mathematic modelled and/or empirically determined definitions, which describe the relationship between temperature and/or temperature change of a brake surface and the resulting wear thereof.

The wear of the brake surface may also be determined by determining a change of the kinetic energy of the vehicle and, from this, calculating the wear in a manner comparable to the previously described determination of the temperature and/or temperature change of the brake surface.

Preferably data, which characterize the relationship between temperature and/or temperature change of one or more brake surfaces and/or a changes of the kinetic energy of the vehicle, on the one hand, and the resultant wear of the brake surface, on the other hand, are stored in one or more characteristics maps of the control unit (ECU) of the vehicle.

In order to optimize the operation of the vehicle brake system also in terms of the wear of the brake surface, the braking forces at the brake surface are controlled in dependence upon the wear. In said case, it is intended to use one of the two previously described methods of determining the brake surface wear, or both calculating methods alternately or simultaneously for cross-checking purposes.

A wear factor may be used in order in combination with the temperature and/or temperature change of the brake surface and/or the change of the kinetic energy of the vehicle to determine the brake surface wear. Preferably, different wear factors are used for driving states, in which the vehicle brake system is activated, and for driving states, in which the vehicle brake system is not activated.

The present invention further provides an apparatus for a vehicle brake system, which apparatus comprises devices, units, components and the like, which have been devised and programmed to determine the temperature of one or more brake surfaces in dependence upon a deceleration or acceleration of a vehicle in the activated state of the vehicle brake system. The present invention moreover provides a vehicle brake system, which comprises such an apparatus.

Other advantages of this invention will become apparent to those skilled in the art from the following detailed description of the preferred embodiment, when read in light of the accompanying drawing.

DETAILED DESCRIPTION OF THE INVENTION

Figure 1:
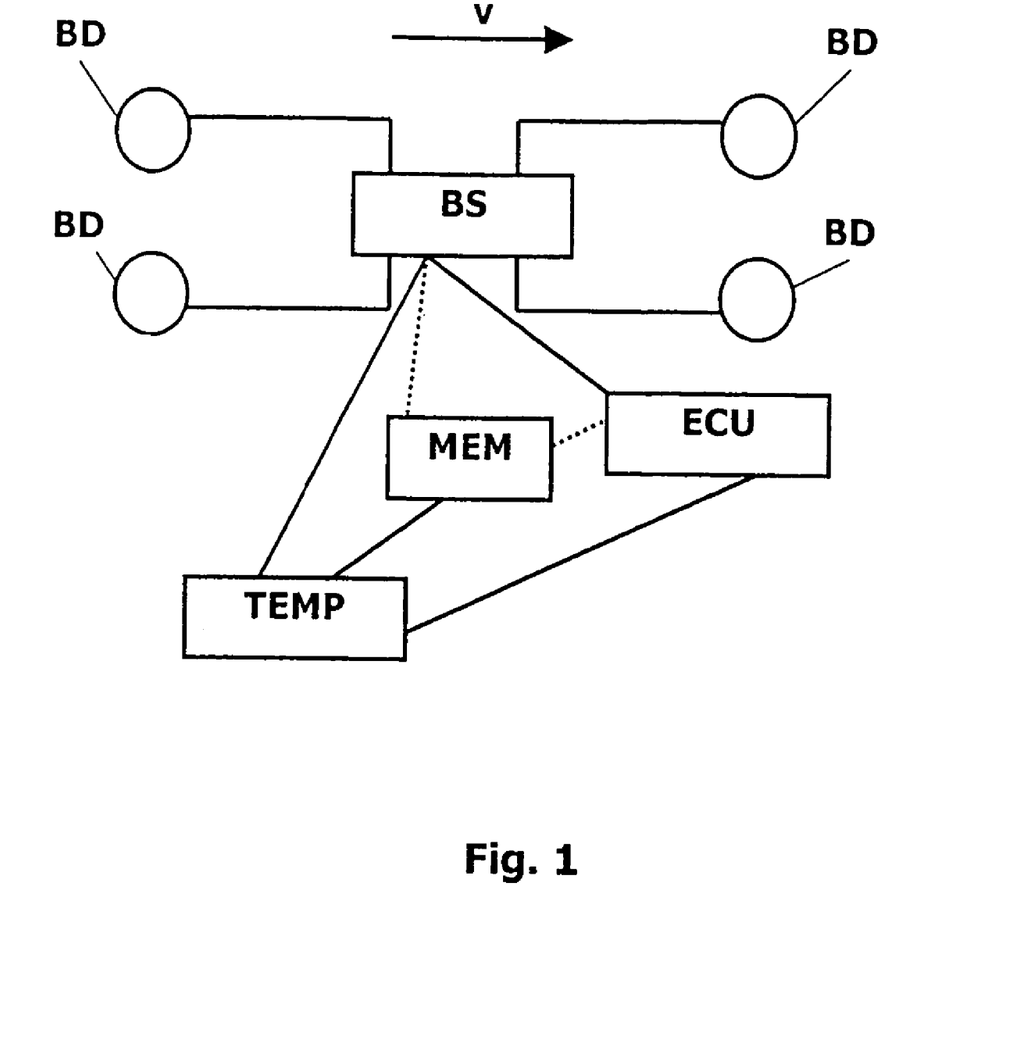
FIG. 1 is a diagrammatic representation of a vehicle having temperature determination according to the invention.

There now follows a description of preferred embodiments using the example of a motor vehicle (car) having an electronic control unit ECU and a vehicle brake system BS, which is controllable electronically and by a vehicle driver. Also described are temperature determinations for a brake surface BD of a wheel brake (not designated) of the vehicle brake system BS, wherein it is intended to effect brake surface temperature determinations in this manner for some or all of the brake surfaces BD of the vehicle.

For effecting temperature determinations of one or more brake surfaces BD, a device TEMP is provided, which has been devised and programmed to execute one or more or all of the steps described below for brake surface temperature determination. A storage device MEM is further provided, which is associated with the temperature-determining device TEMP and, e.g. in the manner described below, stores characteristics maps. As indicated by the dashed lines in FIG. 1, the storage device MEM may also be associated with the vehicle brake system BS and/or with the vehicle control unit ECU. Even though the components ECU, BS, TEMP and MEM are shown separately in FIG. 1, it is intended that one or more or all of the components are integrated in a constructional unit (for the sake of clarity, in the following the reference characters of the components named thus far have been omitted).

Basically, when the vehicle decelerates or accelerates, a constant fraction of the change of its kinetic energy is supplied to the brakes and, in particular, to the brake surfaces of the vehicle brake system if the latter is activated at the time of deceleration or acceleration. Thus, it is possible to represent the thermal energy $W_{therm,b}$ supplied to a brake surface as a function of a change of the kinetic energy of the vehicle $\Delta W_{kin,v}$ as follows:

$$W_{therm,d} = \Delta W_{kin,v} * k,$$

in which k is a vehicle-specific factor and, in particular, a factor, which is specific to the vehicle brake system and which lies between zero and one and characterizes the energy fraction supplied as thermal energy.

For calculating the change of the kinetic energy of the vehicle, as an initial value the kinetic energy resulting from the mass of the vehicle and from the vehicle velocity, at which the vehicle is travelling at the start of the deceleration or acceleration, is taken as a basis. In the case of deceleration of the vehicle, i.e. at the start of a braking operation, the velocity of the vehicle is determined at an instant substantially coinciding with the activation of the vehicle brake system. In contrast thereto, in the case of acceleration of the vehicle, it is possible that the instant, at which the vehicle velocity is determined, lies before or after an activation of the vehicle brake system, when the vehicle brake system at the time of acceleration is already and/or still activated and/or is activated only during the acceleration operation.

The kinetic energy $W_{kin,start}$, which as an initial value forms the basis, of the vehicle having a mass m and the velocity at the start of the braking operation $v_{start}$, which is determined in the manner described above, may be calculated as follows:

$$W_{kin,start}=0.5*m*v^2_{start}.$$

For calculating the kinetic energy of the vehicle at the end of the measuring period, which generally ends with termination of the activation of the vehicle brake system or, if for an activation of the vehicle brake system a plurality of measuring periods are used, lies in the period, in which the vehicle brake system is activated, the vehicle deceleration or vehicle acceleration for the measuring period and the length of the measuring period are determined. The kinetic energy $W_{kin,b}$ of the vehicle at the end of the measuring period may then be calculated as follows:

$$W_{kin,b}=0.5*a^2_b*t^2_b*m,$$

in which $a_b$ characterizes the deceleration or acceleration of the motor vehicle and $t_b$ the length of the measuring period.

From these values of the kinetic energy of the vehicle, the change of the kinetic energy may be calculated and, from this, the thermal energy $W_{therm,b}$ supplied to the brake surface may be calculated:

$$W_{therm,b}=0.5*k*m*(v^2_{start}+a^2_b*t^2b),$$

in which a negative value for $a_b$ indicates a vehicle deceleration and a positive value for $a_b$ indicates a vehicle acceleration.

For determining the vehicle deceleration or vehicle acceleration $a_b$, it is possible to have recourse to devices (e.g. deceleration sensors) of the vehicle brake system and/or to data of the vehicle control system, which indicate e.g. the rotational speeds of the wheels.

Since the brake surface during operation of the vehicle not only receives thermal energy owing to an activation of the vehicle brake system but is also heated by other heat sources and cooled because of operation of the vehicle and/or active cooling apparatuses, use is made of suitable correcting quantities, which ensure a more accurate determination of the brake surface temperature. The cooling energy $W_{therm,c}$, which is generated because of operation of the vehicle and which is primarily cooling as a result of the slip stream produced by the vehicle velocity, is a function of the vehicle velocity. Since vehicles are usually not equipped with sensors that detect the cooling effect of the slip stream, in the absence of suitable additional sensors characteristics maps dependent on the vehicle velocity are used to assign to the different vehicle velocities corresponding cooling energies $W_{therm,c}$ effective for the brake surface. These characteristics maps are associated with the vehicle control system and/or the vehicle brake system or stored in a storage device thereof (see FIG. 1: MEM). For calculating the current cooling energy $W_{therm,c}$, for the current vehicle velocity a corresponding value is read out of the characteristics maps. In the present case, interpolation methods may also be used if for the current vehicle velocity there is no corresponding value available.

If the vehicle is in a stationary state (vehicle velocity=0), the cooling energy $W_{therm,c}$ may be determined in dependence upon a function, which characterizes the incipient cooling characteristic of the vehicle brake system and, in particular, of the brake surface in the stationary state, i.e. substantially without further factors that provide cooling. In the present case, it may be taken into consideration whether the vehicle brake system in the stationary state of the vehicle is activated fully, partially or not at all, i.e. whether or not forces are acting upon the brake surface. This is to be taken into consideration e.g. if the vehicle brake system operates as a hand brake or parking brake in that the vehicle is held in a stationary state by generating forces, which act upon the brake surfaces. In the simplest case, a linear function is used, which indicates the release of thermal energy by the brake surface as a function of time.

Depending on the disassembly of the vehicle and of the vehicle brake system, in particular of the wheel brakes and/or the arrangement of the brake surfaces, the brake surfaces may be heated by thermal energy originating from other heat sources. This is the case, for example, if the brake surface is disposed in the vicinity of the vehicle engine or other heat-dissipating components, such as e.g. the exhaust gas system of the vehicle, and/or the vehicle brake system comprises actuators, electric motors and the like, which are situated in the vicinity of the brake surface.

The thermal energy $W_{therm,b}$ of the brake surface may therefore be calculated as follows:

$$W_{therm,b}=0.5*k*m(v^2_{start}+a^2_b*t^2_b)-W_{therm,c}+W_{therm,h}.$$

From the thermal energy $W_{therm,b}$, which is effectively supplied to the brake surface, the temperature of the brake surface is then determined while simultaneously taking its thermal characteristics into account.

If the vehicle is travelling at a constant velocity and in said case the vehicle brake system is not activated, then when calculating the brake surface temperature(s) in motion the thermal energy values $W_{therm,c}$ and $W_{therm,h}$ are taken into consideration.

There are moreover operating states, in which the vehicle experiences no change of velocity, i.e. is in a stationary state or is travelling at a constant velocity, and at the same time the vehicle brake system is activated at least for a short time for one or more or all of the wheels. This is the case, for example, when the vehicle is situated or travelling on a sloping road and the stationary state or a desired constant velocity is maintained in that the vehicle brake system generates braking forces as a result of actuation by a vehicle driver and/or in a controlled manner. Further examples of this are driving states of the vehicle, in which the vehicle brake system under the control of its own control system and/or of the vehicle control system is activated in such a way that functions of an anti-lock braking system, traction control, an electronic stability program, an antiskid device and the like are provided.

As each activation of the vehicle brake system leads to a change of the temperatures of the brake surfaces, for a more accurate determination of the brake surface temperatures such driving states may also be taken into consideration. The basic approach of using decelerations and accelerations, which are effective for the vehicle, for brake surface temperature determination is used in this case also. The initially used deceleration and acceleration operations lead to a change of the vehicle velocity, i.e. they are vehicle decelerations and vehicle accelerations. Here, therefore, what are taken as a basis are decelerations and accelerations that do not affect the vehicle velocity but are decelerations and accelerations effective at the individual wheels.

For this purpose, decelerations or accelerations as well as the time, during which braking forces are effective, are determined e.g. using the vehicle control system at the wheels, at which the vehicle brake system generates braking forces. From these, the change of the kinetic energy of a wheel, at which braking forces are effective, may be determined and, on the basis thereof, the thermal energy supplied to the wheel may be determined. In order to determine the change of the kinetic energy of a wheel, in a manner comparable to the previous implementations it is possible to take as a basis as an initial value the kinetic energy of the wheel, which results from the angular velocity of the wheel, and/or a previously determined kinetic energy, which results from the respective deceleration and/or acceleration.

It is moreover possible, here, to determine the thermal energy supplied to a brake surface by detecting or determining the braking forces acting upon the wheels in order in combination with the decelerations and/or accelerations effective at the wheels and with the corresponding periods, in which braking forces exist, to determine the work done at the wheels and, from this, the thermal energy supplied to the respective brake surfaces.

The two last-mentioned ways of determining brake surface temperatures may be used alternatively or jointly, which in the latter case leads to a redundant method, which may improve the temperature determination.

The initially described temperature determination on the basis of a vehicle deceleration or vehicle acceleration is easier to implement because, for this purpose, only a deceleration or an acceleration is detected. Accordingly, this procedure is suitable in particular for vehicles, in which the vehicle control system (ECU) and the control system of the vehicle brake system do not supply any information about decelerations and accelerations at individual wheels. This is moreover a solution for vehicles that do not comprise any devices, which provide information about decelerations and accelerations acting on the vehicle. With such vehicles it would merely be necessary to add devices, such as e.g. computer units, storage units, sensors and the like, which are capable of detecting at least a vehicle deceleration and/or vehicle acceleration and calculating brake surface temperatures therefrom.

The determination of brake surface temperatures on the basis of decelerations and accelerations effective at individual wheels may be used, in suitably equipped vehicles, alternatively or in addition to the determination of brake surface temperatures based on a vehicle deceleration or vehicle acceleration.

The brake surface temperature determination on the basis of a vehicle deceleration or vehicle acceleration is faster to implement since the individual wheels do not have to be monitored. This may lead to an imprecise brake surface temperature determination because, in said case, it is assumed that in the event of a deceleration or acceleration of the vehicle the amounts of thermal energy transmitted to the brake surfaces are substantially identical. In vehicles, in which this cannot be guaranteed, or for checking such a temperature determination, the brake surface temperature determination based on decelerations or accelerations effective at the individual wheels is suitable as an alternative or redundant method.

One example of the use of determination of the temperature of a brake surface is a vehicle brake system, which operates as a hand brake or parking brake. In order to prevent a vehicle in the stationary state from rolling away, the parking brake has to generate a suitable minimum braking effect. For this purpose, normally the forces acting by means of the hand brake upon the brake surfaces, hereinafter shortened to brake application forces, are set to a desired, predetermined value. If, for example, after an extended period of operation of the vehicle the brake surfaces have heated up and therefore expanded, the brake application forces set for the expanded state of the brake surfaces decrease as the brake surfaces cool down in the stationary state. For a practically occurring situation, the temperature of the brake surfaces is e.g. in the order of magnitude of 700° C., wherein the brake application forces are in the order of magnitude of 15 kN. After cooling of the brake surface temperature to a temperature in the order of magnitude of 350° C. and an associated reduction in size of the brake surfaces, the so-called lining shrinkage, the brake application forces are only in the order of magnitude of 9 kN. This may result in the vehicle no longer being prevented from rolling away. If, in the manner described above, the brake surface temperature was determined at the time of parking the vehicle, it is then possible, in the stationary state of the vehicle, on the basis of the brake surface temperature existing on attainment of the stationary state to determine the drop of said temperature and increase the brake application forces accordingly. Generally, the decline of the brake application forces during cooling of the brake surfaces follows an exponential function, for which reason the brake application force has to be increased for the first time, as a rule, already after a period of approximately 3 minutes.

A further quantity, which may be taken into consideration during operation of a vehicle brake system, is the wear of brake surfaces. Brake surface wear results—both during vehicle operation and in the stationary state of a motor vehicle—from forces acting upon these brake surfaces. During braking, such forces are generated by a vehicle brake system automatically and/or under the control of a vehicle driver in order to achieve a desired braking effect, i.e. convert a desired amount of kinetic energy of a motor vehicle. However, even in driving states, in which there are no forces generated by a vehicle brake system acting upon brake surfaces, i.e. in the non-braked driving state, forces may arise at the brake surfaces and contribute towards their wear. Such forces may be caused e.g. by foreign bodies (e.g. dust, dirt, granular particles, sludge etc.), which settle on a brake surface or at least enter into an interactive relationship therewith. Wear of a brake surface may be caused in the non-braked driving state also by "runout" of the brake surface, i.e. a deformation, unbalance or the like of the brake surface, as a result of which forces act at least upon individual regions of the brake surface even though no braking forces are being generated by the vehicle brake system.

Since wear of a brake surface has repercussions on the braking effects achievable thereby, an improvement of the method for a vehicle brake system may be achieved when brake surface wear is taken into consideration.

On the one hand, for a brake surface there exists between the forces acting upon it and the wear resulting therefrom a describable relationship, which may be expressed in a mathematically modelled and/or empirically determined manner and may be stored e.g. in characteristics maps in the control unit (ECU) of the vehicle.

Depending on the accuracy with which the relationship between the forces acting upon a brake surface and the brake surface wear resulting therefrom is to be reproduced, brake-surface-specific and/or vehicle-specific factors, maximum forces acting upon a brake surface during one or more and in particular a plurality of successive activations of the vehicle brake system both in the operating state and in the stationary state, the sum, average etc. of forces acting upon a brake surface during a period, in particular during an activation of the vehicle brake system, and the like may be taken into account.

On the other hand, forces acting upon a brake surface lead to a change of temperature of said brake surface.

Accordingly, for determination of the wear of a brake surface, it is possible to use a description, which reproduces the relationship between wear and a temperature and/or temperature change of the brake surface. This procedure has the advantage that temperature changes of a brake surface caused not only by forces acting upon it but also by other influences may be taken into consideration. Such temperature effects may be classed as negligible in view of potential brake surface temperatures of up to 750° C. and above under normal operating conditions. However, if the vehicle is being operated in conditions of extreme ambient temperatures (e.g. in the desert, in the Arctic or Antarctica, in mines or underground), these temperature effects also may lead demonstrably to the wear of a brake surface.

As stated above, the temperature of a brake surface is determined in order to control braking forces at the brake surface in dependence upon said temperature. Consequently, information about the brake surface temperature exists, which may be used to determine the wear of the brake surface. In principle, knowledge of the temperature of a brake surface is enough to allow a conclusion about its wear to be drawn using a suitable (mathematical/empirical) model. Knowledge of the actual wear condition of a brake surface makes it possible, alternatively or in addition to the possibilities described above, to control the level of braking forces at the brake surface in a wear-dependent manner.

In view of the, at times, extremely complex models describing the temperature-dependent wear of a brake surface, the following description, merely for the sake of clarity, takes as a basis a model, in which a distinction is made between temperature-dependent wear of a brake surface with activations of the vehicle brake system (brake operation) and temperature-dependent wear without activation of the vehicle brake system (non-braked travel). For this purpose, a wear factor $VerFT_{brems}$ is used to determine the wear with activations of the vehicle brake system and a wear factor $VerFT_{unbrems}$ is used to determine the wear without activations of the vehicle brake system.

The wear $BrVer(T)$ of a brake surface as a function of its temperature $T$ may then be determined for an activation of the vehicle brake system as follows:

$$BrVer(T)=F_{brems}(T)*F(VerFT_{brems}),$$

in which the function $F_{brems}(T)$ may indicate that for the wear calculation a (maximum) temperature, a temperature change, an averaged temperature, a temperature characteristic, temperature gradients, an integral of the temperatures or temperature changes, which arise during an activation of the vehicle brake system both during vehicle operation and in the stationary state, and the like is (are) used.

The function $F(VerFT_{brems})$ may indicate e.g. a multiplication or division by the wear factor $VerFT_{brems}$ and/or a linear or non-linear allowance for the wear factor $VerFT_{brems}$ (e.g. a power- or exponential function). This applies also to functions relating to the wear factors described below.

Without activation of the vehicle brake system it is possible to determine the wear $BrVer(T)$ of a brake surface as a function of its temperature $T$ as follows:

$$BrVer(T)=F_{unbrems}(T)*F(VerFT_{unbrems}),$$

in which the function $F_{unbrems}(T)$ may indicate that for the wear calculation a (maximum) temperature, a temperature change, an averaged temperature, a temperature characteristic, temperature gradients, an integral of the temperatures or temperature changes, which arise during a predetermined period of time (e.g. between successive activations of the vehicle brake system), and the like is (are) used.

As described above, it is intended to determine the temperature of the brake surface in dependence upon a change of the kinetic energy of the vehicle caused by an activation of the vehicle brake system. Consequently, it is also possible to determine the wear of a brake surface from a change of the kinetic energy of the vehicle. In the following, here too a distinction is made between wear with activation of the vehicle brake system and wear without activation of the vehicle brake system. For the first situation, a wear factor $VerFW_{brems}$ is used to determine the wear with activation of the vehicle brake system.

The wear $BrVer(W_{kin})$ of a brake surface in dependence upon changes of the kinetic energy $W_{kin}$ of the vehicle may then be determined for an activation of the vehicle brake system as follows:

$$BrVer(W_{kin})=F_{brems}(W_{kin})*F(VerFW_{brems}),$$

in which the function $F_{brems}(W_{kin})$ may indicate that for the wear calculation a (maximum) change of the kinetic energy, an averaged change of the kinetic energy, a characteristic of the change of the kinetic energy, gradients of changes of the kinetic energy, an integral of the change of the kinetic energy arising during an activation of the vehicle brake system both during vehicle operation and in the stationary state, and the like is (are) used. For the calculation of the kinetic energy of the vehicle and/or of the change of the kinetic energy, reference is made to the explanations provided above.

Since generally without activation of the vehicle brake system the kinetic energy of the vehicle does not change, it is advantageous to effect the determination of the wear of a brake surface, as described above, in dependence upon the temperature of said brake surface. As an alternative to this determination of the wear of a brake surface, it is possible—both in combination with a temperature-dependent wear determination and in combination with a wear determination in dependence upon changes of the kinetic energy of the vehicle in the activated state of the vehicle brake system—to take as a basis an operating state of the vehicle. Thus, for example, the mileage (driving performance) and/or velocity of the vehicle may be taken into account, since even without activation of the vehicle brake system the wear of a brake surface increases, the further the vehicle travels and/or the higher the velocity of the vehicle is. In the present case, a wear factor $VerFBz_{unbrems}$ is used to determine the wear without activation of the vehicle brake system. The wear $BrVer(Bz)$ of a brake surface in dependence upon the operating state of the vehicle may then be determined as follows:

$$BrVer(Bz)=F_{unbrems}(Bz)*F(VerFBz_{unbrems}),$$

in which the function $F_{unbrems}(Bz)$ may indicate that for the wear calculation the current total mileage of the vehicle, a mileage during a predetermined period of time (e.g. between successive activations of the vehicle brake system or after a service or a change of the brake surface), the current velocity of the vehicle, an averaged velocity, a velocity characteristic, velocity gradients, an integral of the velocities and/or velocity changes, which arise during a predetermined period of time (e.g. between successive activations of the vehicle brake system), and the like is (are) used.

As a concrete example of a wear determination of a brake surface in dependence upon changes of the kinetic energy of the vehicle, in a manner comparable to the previously described calculation of the thermal energy of a brake surface the determined kinetic energy of the vehicle is summed in order, from this, to calculate the wear while simultaneously taking into account a wear factor provided for an activations of the vehicle brake system. Thus, for example, the wear BrVer($W_{kin}$) of a brake surface with activation of the vehicle brake system may be determined as follows:

$$BrVer(W_{kin}) = \Sigma(W_{kin})/F(VerFW_{brems}),$$

in which the wear factor may be empirically determined and advantageously be in the form of characteristics maps in the control unit (ECU) of the vehicle. Experimental examinations carried out on this example have shown that with an activation of the vehicle brake system the brake surface wear lies between 0.5 and 2 µm/kJ.

As a concrete example of a wear determination of a brake surface in dependence upon operating states of the vehicle, the driving performance of the vehicle in kilometres is used and multiplied by the appropriate wear factor:

$$BrVer(Bz) = (\text{kilometres}) * F(VerFBz_{unbrems}),$$

in which, here too, the wear factor may be empirically determined and advantageously be in the form of characteristics maps in the control unit (ECU) of the vehicle. Experimental examinations carried out on this example have shown that without activation of the vehicle brake system the brake surface wear is approximately 0.3 mm per 10,000 km of driving performance.

In accordance with the provisions of the patent statutes, the principle and mode of operation of this invention have been explained and illustrated in its preferred embodiments. However, it must be understood that this invention may be practiced otherwise than as specifically explained and illustrated without departing from its spirit or scope.

What is claimed is:

1. Method for a vehicle brake system, wherein the temperature of a brake surface is determined in dependence upon a deceleration or an acceleration in the activated state of the vehicle brake system, and the level of braking forces upon the brake surface caused by an activation of the vehicle brake system is controlled in dependence upon the temperature of the brake surface, comprising the following steps:
   generate braking forces at the brake surface in order to achieve or maintain a desired driving state for the vehicle,
   determine the temperature of the brake surface,
   determine the braking forces at the brake surface,
   determine a temperature change of the brake surface, and
   control the level of the braking forces at the brake surface if, because of the temperature change of the brake surface, the braking forces are not capable of achieving or maintaining the desired driving state for the vehicle, wherein
when controlling the braking force level, only the level of braking forces generated by the driver is controlled.

2. Method according to claim 1, wherein control of the level of the braking forces at the brake surface is effected in dependence upon the temperature change of the brake surface and the desired driving state for the vehicle.

3. Method according to claim 1, wherein the temperature change of the brake surface is determined by repeating the determination of the temperature of the brake surface at least twice.

4. Method according to claim 1, wherein the temperature change of the brake surface is determined in dependence upon a thermal energy, which the brake surface releases in the stationary state of the vehicle.

5. Method according to claim 1, wherein the temperature of the brake surface is determined in dependence upon a deceleration or acceleration of the vehicle and in dependence upon a deceleration or acceleration of a corresponding wheel of the vehicle.

6. Method according to claim 1, wherein the temperature of the brake surface is determined in dependence upon the length of time, for which the vehicle brake system is activated.

7. Method according to claim 1, wherein the temperature of the brake surface is determined in dependence upon a change of the kinetic energy of the vehicle caused by the activation of the vehicle brake system and in dependence upon the kinetic energy of the wheel in the activated state of the vehicle brake system.

8. Method according to claim 1, wherein the temperature of the brake surface is determined in dependence upon thermal energy, which is supplied to the brake surface substantially independently of the activation of the vehicle brake system.

9. Method according to claim 1, wherein the temperature of the brake surface is determined in dependence upon a thermal energy released by the brake surface.

10. Method according to claim 1, comprising the following steps:
    determine a velocity of the vehicle upon activation of the vehicle brake system,
    determine a deceleration or acceleration in the activated state of the vehicle brake system,
    determine a first kinetic energy using the determined velocity,
    determine a second kinetic energy using the determined deceleration or acceleration,
    compare the first and the second kinetic energy,
    from the comparison of the first and the second kinetic energy determine a thermal energy, which indicates the thermal energy supplied to the brake surface, and
    determine the temperature of the brake surface in dependence upon the thermal energy supplied to the brake surface.

11. Method according to claim 10, wherein the temperature of the brake surface is determined using the determined thermal energy.

12. Method according to claim 10, further comprising the following steps:
    determine a period, which indicates the period of activation of the vehicle brake system, and
    determine the second kinetic energy using the determined period of activation.

13. Method according to claim 10, further comprising the following steps:
    determine a wear of the brake surface on the basis of at least one of the temperature and/or the temperature change of the brake surface, and
    control the level of the braking forces at the brake surface in dependence upon the wear.

14. Method according to claim 13, wherein a wear factor is used to determine the wear.

15. Method according to claim 13, wherein a wear factor is used.

16. Method according to claim 10, further comprising the following steps:
    determine a wear of the brake surface on the basis of a change of the kinetic energy of the vehicle, and
    control the level of the braking forces at the brake surface in dependence upon the wear.

17. Method according to claim 1, wherein the temperature of the brake surface is determined in dependence upon a deceleration or acceleration of the vehicle or in dependence upon a deceleration or acceleration of a corresponding wheel of the vehicle.

18. Method according to claim 1, wherein the temperature of the brake surface is determined in dependence upon a change of the kinetic energy of the vehicle caused by the activation of the vehicle brake system or in dependence upon the kinetic energy of the wheel in the activated state of the vehicle brake system.

19. Apparatus for a vehicle brake system, comprising:
devices for determining the temperature of a brake surface in dependence upon a deceleration or an acceleration in the activated state of the vehicle brake system, and
devices for controlling the level of braking forces upon the brake surface caused by an activation of the vehicle brake system in dependence upon the temperature of the brake surface, wherein
the control devices have been devised and programmed to control the braking forces in order to achieve or maintain a desired driving state for the vehicle, and
the control devices have been devised and programmed to control only the braking forces generated by the driver.

20. Apparatus according to claim 19, wherein the devices for determining the temperature of the brake surface and/or the control devices have been devised and programmed to execute the steps:
generate braking forces at the brake surface in order to achieve or maintain a desired driving state for the vehicle,
determine the temperature of the brake surface,
determine the braking forces at the brake surface,
determine a temperature change of the brake surface, and
control the level of the braking forces at the brake surface if, because of the temperature change of the brake surface, the braking forces are not capable of achieving or maintaining the desired driving state for the vehicle, wherein
when controlling the braking force level, only the level of braking forces generated by the driver is controlled.

21. Apparatus according to claim 19, further comprising a memory having data for executing the steps:
generate braking forces at the brake surface in order to achieve or maintain a desired driving state for the vehicle,
determine the temperature of the brake surface,
determine the braking forces at the brake surface,
determine a temperature change of the brake surface, and
control the level of the braking forces at the brake surface if, because of the temperature change of the brake surface, the braking forces are not capable of achieving or maintaining the desired driving state for the vehicle, wherein
when controlling the braking force level, only the level of braking forces generated by the driver is controlled.

22. Apparatus according to claim 19, further comprising an interface for receiving from at least one of the control devices and/or the detection devices of a vehicle data suitable for at least one of determining the brake surface temperature and/or for controlling the braking forces.

23. Vehicle brake system, which has been devised and programmed to be controlled in accordance with the steps:
generate braking forces at the brake surface in order to achieve or maintain a desired driving state for the vehicle,
determine the temperature of the brake surface,
determine the braking forces at the brake surface,
determine a temperature change of the brake surface, and
control the level of the braking forces at the brake surface if, because of the temperature change of the brake surface, the braking forces are not capable of achieving or maintaining the desired driving state for the vehicle, wherein
when controlling the braking force level, only the level of braking forces generated by the driver is controlled.

24. Vehicle brake system according to claim 23, comprising a storage medium having data for controlling the vehicle brake system in accordance with the steps.

25. Vehicle brake system, comprising
a vehicle brake having a brake surface;
devices for determining the temperature of the brake surface in dependence upon a deceleration or an acceleration in the activated state of the vehicle brake system, and
control devices for controlling the level of braking forces upon the brake surface in dependence upon the temperature of the brake surface, the control devices being programmed to control the braking forces generated by the driver in order to achieve or maintain a desired driving state for the vehicle, wherein the control devices are programmed to control, if the brake forces are not capable of achieving or maintaining the desired driving state for the vehicle due to the temperature change of the brake surface, only the braking forces generated by the driver.

* * * * *